(12) United States Patent
Nakajima et al.

(10) Patent No.: US 8,571,372 B2
(45) Date of Patent: Oct. 29, 2013

(54) OPTICAL FIBER

(75) Inventors: Yasuo Nakajima, Tokyo (JP); Kouji Mochizuki, Tokyo (JP); Hiroki Tanaka, Tokyo (JP); Yoshihiro Arashitani, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 13/101,377

(22) Filed: May 5, 2011

(65) Prior Publication Data

US 2011/0274396 A1  Nov. 10, 2011

Related U.S. Application Data

(63) Continuation of application No. PCT/JP2010/067648, filed on Oct. 7, 2010.

(30) Foreign Application Priority Data

Dec. 17, 2009  (JP) ................................. 2009-286824

(51) Int. Cl.
*G02B 6/028* (2006.01)
*G02B 6/036* (2006.01)

(52) U.S. Cl.
USPC .......................................................... 385/128

(58) Field of Classification Search
USPC ........................... 427/169, 493, 513; 385/128
See application file for complete search history.

(56) References Cited

U.S. PATENT DOCUMENTS 5,334,421 A * 8/1994 McNutt .......................... 427/513
7,085,465 B2   8/2006 Ono et al.
(Continued)

FOREIGN PATENT DOCUMENTS

JP   64-70715    3/1989
JP   4-268521    9/1992
(Continued)

OTHER PUBLICATIONS

International Search Report issued Nov. 2, 2010, in Patent Application No. PCT/JP2010/067648 (with English Translation of Category of Cited Documents).

(Continued)

*Primary Examiner* — Ryan Lepisto
*Assistant Examiner* — Erin Chiem
(74) *Attorney, Agent, or Firm* — Oblon, Spivak, McClelland, Maier & Neustadt, L.L.P.

(57) ABSTRACT

The present invention provides an optical fiber in which the transmission loss increase is suppressed even under a high-humidity condition or under a water-immersed condition. A colored optical fiber (22) according to an embodiment of the present invention is a colored optical fiber (22) formed by applying a colored layer to an optical fiber (14) including a glass optical fiber coated with at least a double-layered coating layer of a soft layer and a hard layer, and the ratio of thermal expansion coefficient between the coating layer after the colored layer of the colored optical fiber (22) is applied and the coating layer of the optical fiber (14) before the colored layer is applied is 0.87 or more. Furthermore, an optical fiber ribbon (32) according to another embodiment of the present invention is an optical fiber (32) formed by arranging a plurality of the colored optical fiber (22) in the form of a plane and coating them all together with a ribbon resin and the ratio of thermal expansion coefficient between the coating layer after the colored layer of the colored optical fiber (22) is applied and the coating layer of the optical fiber before the colored layer is applied is 0.90 or more.

3 Claims, 2 Drawing Sheets

(56) References Cited

U.S. PATENT DOCUMENTS

| | | |
|---|---|---|
| 7,551,825 B2 | 6/2009 | Nakajima et al. |
| 7,555,183 B2 | 6/2009 | Arashitani et al. |
| 7,729,564 B2 | 6/2010 | Nakajima et al. |
| 7,978,948 B2 | 7/2011 | Nakajima et al. |
| 2008/0112676 A1* | 5/2008 | Nakajima et al. ............ 385/114 |
| 2008/0212925 A1 | 9/2008 | Arashitani et al. |
| 2009/0022461 A1 | 1/2009 | Nakajima et al. |
| 2009/0052847 A1 | 2/2009 | Arashitani et al. |
| 2010/0046900 A1 | 2/2010 | Nakajima et al. |
| 2010/0119198 A1 | 5/2010 | Nakajima et al. |
| 2010/0266257 A1 | 10/2010 | Nakajima et al. |

FOREIGN PATENT DOCUMENTS

| | | |
|---|---|---|
| JP | 05-241052 | 9/1993 |
| JP | 2001-199748 | 7/2001 |
| JP | 2002-255590 | 9/2002 |
| JP | 2006-324133 | 11/2006 |
| JP | 2008-224744 | 9/2008 |

OTHER PUBLICATIONS

N. Akasaka, et al., "Design of Optical Fiber Coating", Proc. of 19$^{th}$ Australian Conference on Optical Fiber Technology (ACOFT), 1994, pp. 375-378.

International Preliminary Report on Patentability issued Jul. 19, 2012 in PCT/JP2010/067648 filed Oct. 7, 2010 (with English-language translation).

U.S. Appl. No. 13/754,985, filed Jan. 31, 2013, Tanaka, et al.

\* cited by examiner

OPTICAL FIBER

CROSS-REFERENCES TO RELATED APPLICATIONS

This application is a continuation application of International Application No. PCT/JP2010/067648, filed Oct. 7, 2010, which claims the benefit of Japanese Patent Application No. 2009-286824, filed Dec. 17, 2009. The contents of the aforementioned applications are incorporated herein by reference in their entities.

TECHNICAL FIELD

The present invention relates to an optical fiber accommodated within an optical fiber cable. Specifically, the present invention relates to an optical fiber in which an increase in transmission loss of an optical fiber caused by a use environment and age-related deterioration has been suppressed and, more particularly, to an optical fiber in which the transmission loss does not increase for a long period of time even in a high-humidity state or an immersed state or in which the transmission loss has been reduced and water resistance is excellent.

BACKGROUND ART

In an optical fiber, a transmission loss increases by various external stresses or microbend resulting there from. Therefore, it is necessary to protect an optical fiber against such external stresses and in general, an optical fiber is coated with a coating having a double-layered structure of a soft layer and a hard layer. An inner layer contacting with quartz glass is formed as a buffer layer (hereinafter, referred to as a primary layer) by using a soft resin having comparatively low Young's modulus and an outer layer is formed as a protective layer (hereinafter, referred to as a secondary layer) by using a hard resin having comparatively high Young's modulus. In general, for the primary layer, a resin having Young' modulus of 3 MPa or less is used and for the secondary layer, a resin having Young's modulus of 500 MPa or more is used.

In a method of manufacturing an optical fiber, first, a preform containing quartz glass as a principal component is heated and melted in a drawing furnace to manufacture a quartz glass-made optical fiber. Next, a liquid ultraviolet curing resin is applied to the quartz glass-made optical fiber by using a coating die and then it is irradiated with ultraviolet rays to cure the ultraviolet curing resin. In this way, the quartz glass-made optical fiber is coated with a primary layer and a secondary layer and thus an optical fiber is manufactured. In the present specification, such an optical fiber coated with a primary layer and a secondary layer is referred to as an optical fiber. As described above, by coating the outer circumference of the quartz glass-made optical fiber with a coating resin immediately after the drawing, it is possible to prevent the strength of the optical fiber obtained from being deteriorated.

Furthermore, in the next step, by coating the outer circumference of the optical fiber obtained with a coating layer including a colored resin etc., a colored optical fiber is manufactured. A structure of an optical fiber is shown in FIG. 1. It should be noted that, in the present specification, a plurality of colored optical fibers arranged in the form of a plane and coated all together with a ribbon resin is referred to as an optical fiber ribbon. Furthermore, an optical fiber, a colored optical fiber, and an optical fiber ribbon are referred to all together as an optical fiber.

As a coating resin for an optical fiber, an ultraviolet curing resin is used predominantly. As an ultraviolet curing resin, a urethane acrylate-based resin or an epoxy acrylate-based resin is used.

There is a case where the transmission loss increases when such an optical fiber is immersed in water. In order to obtain an optical fiber having high reliability in which an increase in transmission loss of the optical fiber is suppressed even when used for a long period of time in a state of being immersed in water as described above, various proposals have been made such as improvement of a close adhesion between a primary layer and a glass optical fiber (see Patent Document 1).

In an optical fiber in which the transmission loss has increased, peeling is observed at the interface between the glass optical fiber and the primary layer. The peeling at the interface between the glass optical fiber and the primary layer occurs when a force to peel off the coating layer exceeds an adhesive force at the interface between the glass optical fiber and the coating layer at the interface between the glass optical fiber and the coating layer. If the peeling occurs at the interface, the force applied to the glass becomes uneven, resulting in an increase in transmission loss because of the occurrence of microbend.

The mechanism in which the adhesive force at the interface between the glass optical fiber and the coating layer when being immersed in water is reduced is speculated as follows. When an optical fiber is immersed in water or exposed to a high-humidity atmosphere, the water passes through the coating layer and eventually reaches the interface between the glass optical fiber and the primary layer. There is produced an adhesive force at the interface between the glass optical fiber and the primary layer and in general, the adhesive force is formed by the hydrogen bond between the glass and the functional group in the resin and the chemical bond of an adhesion promoter. However, it is considered that the hydrogen bond is cut when water and the like penetrate the interface between the glass and the primary layer. As described above, it is inferred that the adhesive force at the interface between the glass optical fiber and the primary layer is reduced when the hydrogen bond is cut (see Non-Patent Document 1).

[Patent Document 1] Japanese Patent Application Laid-Open Publication No. 1992-268521

[Non-Patent Document 1] N. Akasaka et al., "Design of Optical Fiber Coating", Proc. of 19th Australian Conference on Optical Fiber Technology (ACOFT), p. 375, 1994

SUMMARY OF INVENTION

With the remarkable spread of optical fibers in recent years, the applicable range of the optical fiber cable has been extending greatly. This means that the environment in which the optical fiber cable is used has diversified and further, a new cable structure is being developed. Therefore, the long-term reliability demanded for the optical fiber cable has become very severe.

Under such circumstances described above, examination of an optical fiber in which the transmission loss is hard to be increased even if being exposed to an immersed state has been made. However, there are limitations of addressing the above-mentioned problem while keeping the balance of the connectivity of each layer interface, and at present, the optical fiber is put into practical use by combining a configuration in which water is prevented from reaching the optical fiber by further examining the cable structure or cord, or the sheath material and a configuration in which the amount of water that reaches the optical fiber is reduced, and thus its reliability has not been sufficient.

An object of the present invention is to provide an optical fiber in which the transmission loss is hard to be increased when the optical fiber accommodated, for example, in an optical fiber cable is subjected to a use environment or age-related deterioration and in particular, when being exposed to a high humidity.

In order to solve the above-mentioned problem, a colored optical fiber of the present invention comprises an optical fiber having at least a double-layered coating layer of a soft layer and a hard layer and a glass optical fiber coated with the coating layer; and a colored layer which coats the optical fiber and which is formed by being applied to the optical fiber, wherein a coating layer of the colored optical fiber is formed by the coating layer and the colored layer, and a ratio of thermal expansion coefficient of the coating layer of the colored optical fiber after the colored layer is applied relative to the thermal expansion coefficient of the coating layer of the optical fiber before the colored layer is applied is 0.87 or more.

Furthermore, an optical fiber ribbon of the present invention is an optical fiber ribbon formed by arranging a plurality of colored optical fibers in the form of a plane and coating them all together with a ribbon resin, wherein the ratio of thermal expansion coefficient of the coating layer of the colored optical fiber after the colored layer is applied relative to the thermal expansion coefficient of the coating layer of the optical fiber is 0.90 or more.

According to the optical fiber of the present invention, an increase in transmission loss can be suppressed when the optical fiber is exposed to water or high humidity by using an optical fiber in which the ratio of thermal expansion coefficient between a coating layer formed by applying a colored layer to an optical fiber and a coating layer of an optical fiber is 0.87 or more. Furthermore, it is possible to provide an optical fiber in which the transmission loss is hard to be increased when the optical fiber is subjected to a use environment or age-related deterioration and in particular, when being exposed to a high humidity by using an optical fiber in which the ratio of thermal expansion coefficient between a coating layer formed by applying a colored layer to an optical fiber and a coating layer of an optical fiber is 0.90 or more.

DESCRIPTION OF EMBODIMENTS

Figure 1:
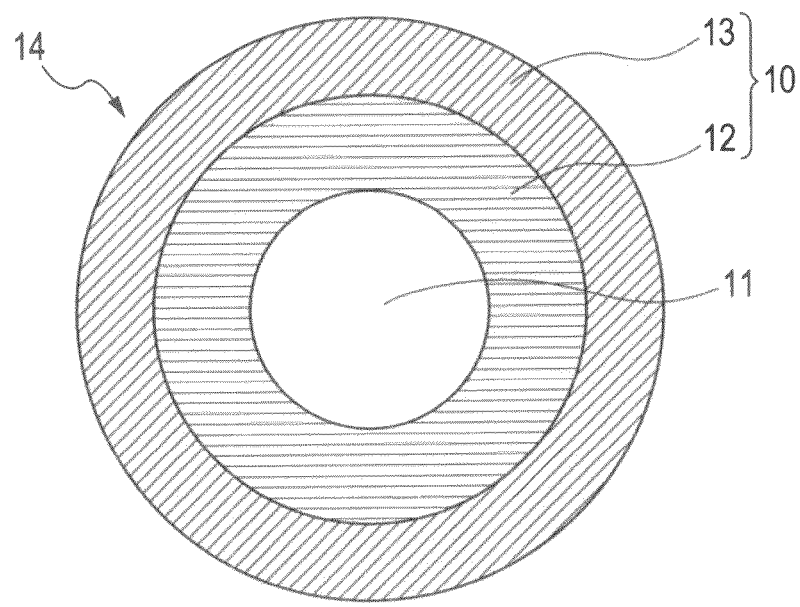
FIG. 1 is a cross-sectional view of an embodiment of an optical fiber of the present invention.
Figure 2:
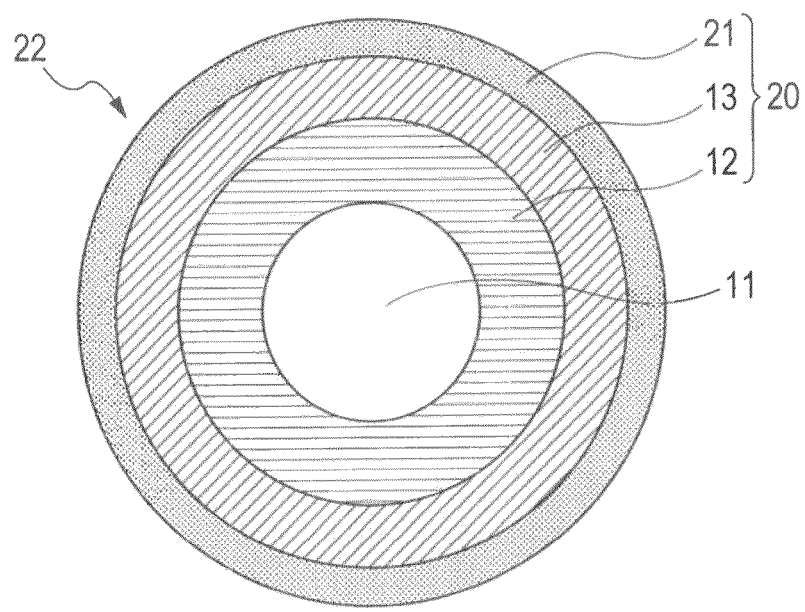
FIG. 2 is a cross-sectional view of an embodiment of a colored optical fiber of the present invention.

Hereinafter, an embodiment of the present invention will be explained. In the embodiment of the present invention, an optical fiber 14 as shown in FIG. 1 is manufactured by coating a glass fiber 11 with a primary layer 12 and a secondary layer 13 and a colored optical fiber 22 is manufactured by coating the optical fiber 14 with a colored layer 21 as shown in FIG. 2. As a resin constituting each coating, an ultraviolet curing resin is used. Furthermore, it is possible to manufacture an optical fiber ribbon by arranging a plurality of the optical fibers on a plane and coating them all together with a ribbon resin including an ultraviolet curing resin in accordance with its use.

The ultraviolet curing resin used as a coating resin or colored resin of an optical fiber includes, as principal components, oligomer, diluent monomer, optical initiator, chain transfer agent, silane coupling agent, and various additive agents. As oligomer, urethane acrylate-based one, epoxy acrylate-based one, and polyester acrylate-based one are used predominantly. As diluent monomer, a monofunctional acrylate or multifunctional acrylate is used.

The colored optical fiber in the present invention suppresses an increase in transmission loss when being exposed to water or high humidity by setting the ratio of thermal expansion coefficient between a coating layer 20 (the primary layer 12, the secondary layer 13, and the colored layer 21) after the colored layer is applied to the optical fiber and a coating layer 10 (the primary layer 12 and the secondary layer 13) before the colored layer is applied to 0.90 or more. Furthermore, the ratio of thermal expansion coefficient between the coating layer 20 (the primary layer 12, the secondary layer 13, and the colored layer 21) after the colored layer is applied to the optical fiber and the coating layer (the primary layer 12 and the secondary layer 13) before the colored layer is applied is desirably 1.05 or less from the viewpoint of the mechanical characteristics

EXAMPLES

As shown in FIG. 1, several kinds of the optical fiber 14 were manufactured by coating the glass fiber 11 including quartz glass with the double-layered coating resin layer of the primary layer 12 and the secondary layer 13. As each resin, the ultraviolet curing resin was used. The ultraviolet curing resin includes oligomer, diluent monomer, optical initiator, chain transfer agent, and additive agent and the several kinds of the optical fiber 14 are manufactured by varying the component materials.

The ratio of thermal expansion coefficient between the coating layer after the colored layer is applied to the optical fiber 14 and the coating layer of the optical fiber before the colored layer is applied can be appropriately varied by the skeleton structure and molecular weight of oligomer and/or the kind of diluent monomer to be applied and the amount of application. In general, because of the application of pigment, the ultraviolet curing resin used in the colored layer has a low transmittance of ultraviolet and a tendency in which the ultraviolet curing resin is hard to be cured. Consequently, a method is used, which increases the degree of curing by increasing the content of the multifunctional monomer of the ultraviolet curing resin used in the colored layer in comparison with that of the ultraviolet curing resin used in the secondary layer or reducing the molecular weight of oligomer. Therefore, the cross-linking density and Young's modulus of the ultraviolet curing resin used in the colored layer become high and the thermal expansion coefficient thereof tends to be smaller in comparison with that of the ultraviolet curing resin used in the secondary layer.

By applying the composition equivalent to the coating resin of the secondary layer as the ultraviolet curing resin used in the colored layer, it is possible to make the thermal expansion coefficient of the coating layer after the colored layer is applied substantially the same level as that of the coating layer of the optical fiber. In this case, there is apprehension about the reduction in the degree of curing of the ultraviolet curing resin used in the colored layer, but this can be adjusted by changing the kinds of the optical initiator or increasing the amount of addition. In the present example, as the optical initiator of the ultraviolet curing resin used in the colored layer, Irgacure907 (Ciba Inc.) 2.5 wt %, Darocur1173 (Ciba Inc.) 3.3 wt % are added.

In addition, it is possible to increase the thermal expansion coefficient by reducing Young's modulus, but the thermal expansion coefficient tends to vary depending on the molecular structure. For example, when the free rotation of each functional group or the free rotation of the main chain is suppressed, the thermal expansion coefficient is not always increased even if Young's modulus is reduced.

It should be noted that the optical fiber 14 has the primary layer 12 having an outer diameter of 195 μm on the outer circumference of the glass fiber 11 including quartz glass and having an outer diameter of 125 μm, and has the secondary layer 13 having an outer diameter of 245 μm on the further outer circumference thereof. In addition, the colored optical fiber in Examples 1, 3, 5 and in Comparative example 1 shown in Table 1 was defined as the colored optical fiber 22 having an outer diameter of 255 μm by coating the colored layer 21 in a different step after manufacturing the optical fiber as shown in FIG. 2.

Figure 3:
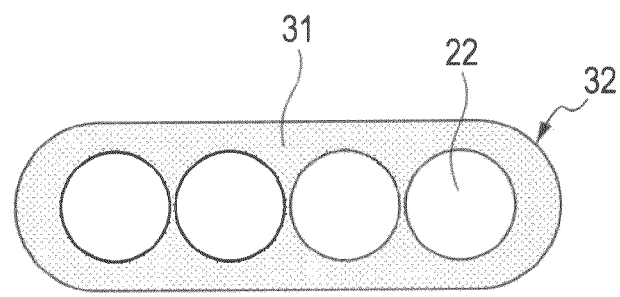
FIG. 3 is a cross-sectional view of an optical fiber ribbon of the present invention.

Moreover, the optical fiber ribbon in Examples 2, 4 and Comparative examples 2, 3 shown in Table 1 was defined as an optical fiber ribbon 32 by arranging the four colored optical fiber 22 in parallel in the form of a plane as shown in FIG. 3 and coating them all together with a ribbon resin including the ultraviolet curing resin. It should be noted that the optical fiber ribbons in Examples 2, 4 were manufactured by using the colored optical fibers in Examples 1, 3, respectively, and the optical fiber ribbons in Comparative examples 2, 3 were manufactured by using the colored optical fiber in Comparative example 1 and Example 5, respectively.

For the obtained colored optical fiber 22 and the optical fiber ribbon 32, the thermal expansion coefficient and the transmission loss of the coating layer were measured by the method described below. The results are shown in Table 1.

(Thermal Expansion Coefficient of Coating Layer of Optical Fiber)

The amount of thermal expansion (μm) of only the coating layer of the optical fiber was measured through the use of the thermomechanical analyzer (TMA40, Mettler-Toledo International Inc.). The measurement conditions are as follows.

Measurement conditions: Applied load: 0, temperature range: −100 to 100° C., heating rate: 10° C./min.

Figure 4:
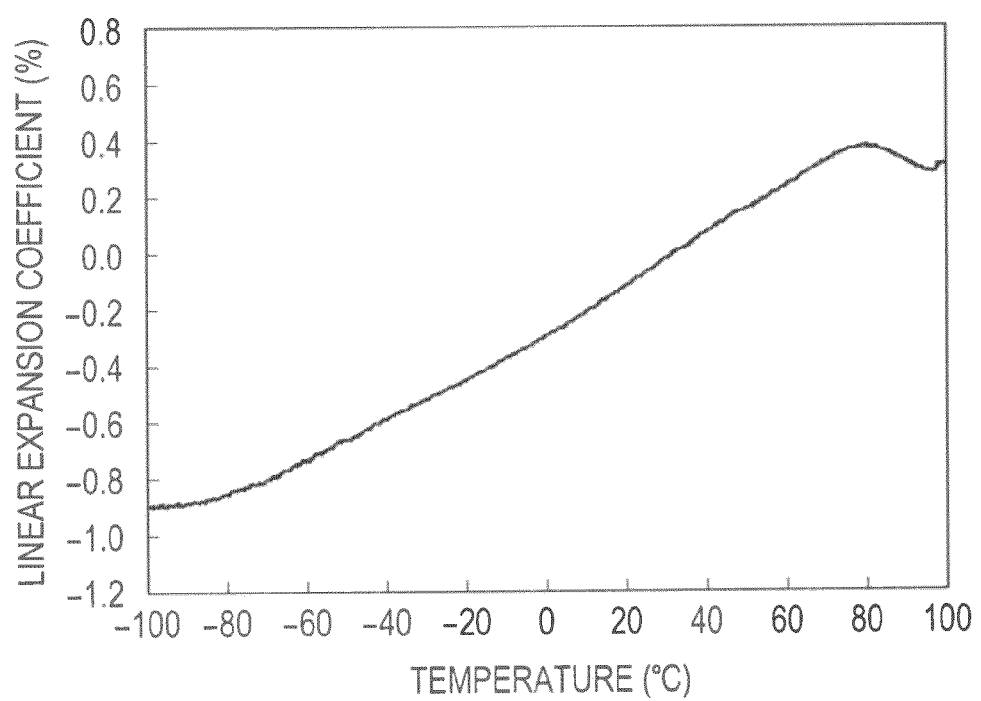
FIG. 4 is a diagram showing a relationship between temperature and linear expansion coefficient.

A sample including only the coating layer was manufactured by peeling off only the coating from the optical fiber and the thermal expansion coefficient in the longitudinal direction of the sample was measured. The thermal expansion coefficient of the coating layer changes considerably in the vicinity of the glass transition temperature of the coating layer, and therefore, it is preferable to set the thermal expansion coefficient in a range including all the glass transition points of the coating layer and as shown in FIG. 4, the thermal expansion coefficient was obtained from a linear range, that is, the temperature range of −50° C. to 25° C.

(Measurement of Fiber Attenuation)

The transmission loss was measured by immersing a colored optical fiber or optical fiber ribbon having a length of about 1 km in water heated to 60° C. for 30 days. The transmission loss was measured by the optical time-domain reflectometry (OTDR) method through the use of the optical pulse tester MW9060A made by Anritsu Corporation with a wavelength of 1.55 μm. When it is perceived that the transmission loss has increased 0.1 dB/km or more after the immersion in hot water at 60° C. for 30 days, the wire is determined to not have durability against a use environment and mark x is attached in Table 1. When it is not perceived that the transmission loss has increased 0.1 dB/km or more after the immersion in hot water at 60° C. for 30 days but it is perceived that the transmission loss has increased 0.1 dB/km or more after the immersion for 90 days, the wire is determined to satisfy the durability against the use environment and mark ○ is attached in Table 1. Furthermore, when it is not perceived that the transmission loss has increased 0.1 dB/km or more after the immersion in hot water at 60° C. for 30 days and it is also not perceived that the transmission loss has increased 0.1 dB/km or more after the immersion for 90 days, the wire is determined to sufficiently satisfy the durability against the use environment and mark ○○ is attached in Table 1. Moreover, by observing the colored optical fiber or optical fiber ribbon after the test by an optical microscope, it was confirmed that the peeling has occurred at the interface between the glass of the optical fiber and the coating layer.

TABLE 1

|  | units | Example 1 | Example 2 | Example 3 | Example 4 | Example 5 | Comparative Example 1 | Comparative Example 2 | Comparative Example 3 |
|---|---|---|---|---|---|---|---|---|---|
| Elastic modulus of primary material | MPa | 1.4 | 1.4 | 1.4 | 1.4 | 1.4 | 1.4 | 1.4 | 1.4 |
| Elastic modulus of secondary material | MPa | 760 | 760 | 760 | 760 | 760 | 760 | 760 | 760 |
| Elastic modulus of coloring material | MPa | 760 | 760 | 1050 | 1050 | 1200 | 1800 | 1800 | 1200 |
| Glass transition temperature of primary coating resin | °C. | −5 | −5 | −5 | −5 | −5 | −5 | −5 | −5 |
| Glass transition temperature of secondary coating resin | °C. | 92 | 92 | 92 | 92 | 92 | 92 | 92 | 92 |
| Glass transition temperature of coloring material | °C. | 92 | 92 | 103 | 103 | 104 | 96 | 96 | 104 |
| Thermal expansion coefficient of coating layer of optical fiber | ×10$^{-4}$ K$^{-1}$ | 0.93 | 0.93 | 0.93 | 0.93 | 0.93 | 0.93 | 0.93 | 0.93 |
| Thermal expansion coefficient of coating layer of colored optical fiber | ×10$^{-4}$ K$^{-1}$ | 0.93 | 0.93 | 0.84 | 0.84 | 0.81 | 0.79 | 0.79 | 0.81 |
| Ratio of thermal expansion coefficient (colored optical fiber/optical fiber) |  | 1.00 | 1.00 | 0.90 | 0.90 | 0.87 | 0.85 | 0.85 | 0.87 |
| State when measuring transmission loss |  | Colored optical fiber | Ribbon | Colored optical fiber | Ribbon | Colored optical fiber | Colored optical fiber | Ribbon | Ribbon |
| Increase in transmission loss when wavelength 1.55 μm is used | dB/km |  |  |  |  |  |  |  |  |
| After immersion for 30 days at 60° C. |  | 0.00 | 0.00 | 0.00 | 0.00 | 0.05 | 0.15 | 0.27 | 0.11 |
| After immersion for 90 days at 60° C. |  | 0.00 | 0.00 | 0.12 | 0.18 | 0.10 | 0.20 | 0.40 | 0.16 |
| Determination |  | ○○ | ○○ | ○ | ○ | ○ | x | x | x |

As is obvious from the above-described explanation, according to the optical fiber of the present invention, it was possible to confirm that the transmission loss does not increase even after the immersion in hot water at 60° C. for 30 days by using a colored optical fiber manufactured by further coating an optical fiber including a glass optical fiber coated with a double-layered coating layer of at least a soft layer and a hard layer with a coating layer including a colored resin in which the ratio of thermal expansion coefficient between the coating layer after the colored layer is applied to the optical fiber and the coating layer of the optical fiber is 0.87 or more. Furthermore, it was possible to confirm that the transmission loss does not increase even after the immersion for 90 days when the ratio of thermal expansion coefficient between the coating layer after the colored layer is applied to the optical fiber and the coating layer of the optical fiber is 1.00 or more.

In addition, it may also be possible to manufacture an optical fiber ribbon by arranging a plurality of the above-mentioned colored optical fiber in the form of a plane and coating them all together with a ribbon resin. In the case of the optical fiber ribbon, it was possible to confirm that the transmission loss does not increase even after the immersion in hot water at 60° C. for 30 days by using a colored optical fiber in which the ratio of thermal expansion coefficient between the coating layer after the colored layer is applied to the optical fiber, and the coating layer of the optical fiber is 0.90 or more. Furthermore, it was possible to confirm that the transmission loss does not increase even after the immersion for 90 days when the ratio of thermal expansion coefficient between the coating layer after the colored layer is applied to the optical fiber and the coating layer of the optical fiber is 1.00 or more.

It is estimated that the reason for the fact that the ratio of thermal expansion coefficient in which the transmission loss does not increase differs between the colored optical fiber and the optical fiber ribbon is because the optical fiber ribbon is manufactured by further coating a ribbon resin on the colored optical fiber, and therefore, when peeling occurs at the interface between the glass and the primary layer, an irregular force applied to the glass becomes larger in the case of the optical fiber ribbon since the coating layer is thicker than that of the colored optical fiber.

In contrast, from the measurement results of Comparative examples 1 to 3, it has been perceived that the increase in the transmission loss is 0.1 dB/km or more when the ratio of thermal expansion coefficient between the coating layer manufactured by applying the colored layer to the optical fiber and the coating layer of the optical fiber is less than 0.87 in the case of the colored optical fiber. Furthermore, it has also been perceived that the increase in the transmission loss is 0.1 dB/km or more when the ratio of thermal expansion coefficient between the above-mentioned coating layer and the coating layer of the optical fiber ribbon is less than 0.90.

It is not possible to measure the thermal expansion coefficient of the colored layer itself, but the fact that the thermal expansion coefficient of the coating layer of the colored optical fiber is smaller in comparison with the thermal expansion coefficient of the coating layer of the optical fiber suggests that the thermal expansion coefficient of the colored layer is smaller than the thermal expansion coefficient of the coating layer of the optical fiber. Furthermore, those having a higher elasticity tend generally to have a smaller thermal expansion coefficient and thus, in such a case, it is estimated that the elasticity of the colored layer is higher than that of the secondary layer. When they are in such a state, it is meant that distortion has occurred at the contact interface between the secondary layer and the colored layer.

If such distortion occurs, an irregular force is generated in the coating layer when peeling takes place at the interface between the glass of the optical fiber and the coating layer and as a result, the irregular force is applied to the glass. Therefore, there is a case where a transmission loss due to the microbend loss is generated.

When there is a difference in the thermal expansion coefficient between the colored layer and the coating layer of the optical fiber, there is a case where bending occurs at the contact interface between the secondary layer and the colored layer when a change in temperature is applied as in a temperature cycling test. In such a case also, an irregular force is generated in the coating layer and such an irregular force is applied to the glass as a result. Therefore, it is desirable that the thermal expansion coefficient of the colored optical fiber and the thermal expansion coefficient of the optical fiber are the same.

In the embodiment, a single mode fiber having a refractive index profile of the normal step index type is used, but it is obvious to those skilled in the art that the present invention can also be applied to an optical fiber having another profile.

As described above, according to the present invention, a colored optical fiber and an optical fiber ribbon can be obtained in which an increase of transmission loss is suppressed even when being subjected to a use environment or age-related change or in particular, even when being exposed to water or to a high humidity atmosphere.

The invention claimed is:

1. A colored optical fiber comprising:
an optical fiber; and
a colored layer which coats the optical fiber and which is formed by being applied to the optical fiber, wherein
the optical fiber includes a glass fiber and at least a double-layered coating layer that coats the glass fiber, the double-layered coating layer including a soft layer and a hard layer,
an elastic modulus of the colored layer is equal to or less than an elastic modulus of the hard layer,
the double-layered coating layer and the colored layer are an ultraviolet curing resin,
a ratio of thermal expansion coefficient of a first configuration of coating layers relative to the thermal expansion of coefficient of a second configuration of coating layers is greater than or equal to 1.00 and less than or equal to 1.05, the first configuration of coating layers including the soft layer, the hard layer, and the colored layer of the colored optical fiber, the second configuration of coating layers including the soft layer and the hard layer of the optical fiber in a state where the colored layer does not exist, and
an increase in a transmission loss for the colored optical fiber in a wavelength of 1.55 μm having a length of 1 km is 0.00 dB/km when immersed in water heated to 60° C. for 90 days.

2. An optical fiber ribbon formed by arranging a plurality of the colored optical fibers according to claim 1 in the form of a plane and coating the plurality of the colored optical fiber all together with a ribbon resin.

3. The colored optical fiber according to claim 1, wherein the colored layer has a composition equivalent to the hard layer, and the colored layer is different from the hard layer only in types or amount of optical initiator added thereto.

* * * * *